(12) United States Patent
Asakura et al.

(10) Patent No.: US 9,718,698 B2
(45) Date of Patent: Aug. 1, 2017

(54) HYDROTALCITE-LIKE PARTICULATE MATERIAL AND METHOD FOR PRODUCTION THEREOF

(75) Inventors: Takeo Asakura, Chiba (JP); Mutsuhiro Ono, Tokyo (JP); Takashi Kajimoto, Kanagawa (JP)

(73) Assignee: JDC CORPORATION, Tokyo (JP)

( * ) Notice: Subject to any disclaimer, the term of this patent is extended or adjusted under 35 U.S.C. 154(b) by 662 days.

(21) Appl. No.: 12/375,904

(22) PCT Filed: Jul. 31, 2007

(86) PCT No.: PCT/JP2007/000814
§ 371 (c)(1),
(2), (4) Date: Nov. 20, 2009

(87) PCT Pub. No.: WO2008/015784
PCT Pub. Date: Feb. 7, 2008

(65) Prior Publication Data
US 2010/0075847 A1    Mar. 25, 2010

(30) Foreign Application Priority Data

Jul. 31, 2006  (JP) ................................ 2006-207972

(51) Int. Cl.
| | | |
|---|---|---|
| *B01J 20/04* | (2006.01) | |
| *C01F 7/00* | (2006.01) | |
| *B01J 20/08* | (2006.01) | |
| *B01J 41/10* | (2006.01) | |

(52) U.S. Cl.
CPC ............ *C01F 7/005* (2013.01); *B01J 20/041* (2013.01); *B01J 20/08* (2013.01); *B01J 41/10* (2013.01); *C01P 2002/60* (2013.01); *C01P 2006/82* (2013.01); *Y10T 428/2982* (2015.01)

(58) Field of Classification Search
CPC . C01F 7/005; B01J 41/20; B01J 20/08; C01P 2006/82; C01P 2002/60; Y10T 428/2982
See application file for complete search history.

(56) References Cited

U.S. PATENT DOCUMENTS

| | | | |
|---|---|---|---|
| 3,539,306 A | | 11/1970 | Kumura et al. |
| 4,656,156 A | | 4/1987 | Misra |
| 5,079,203 A | * | 1/1992 | Pinnavaia ............ B01D 53/864 502/80 |
| 5,213,794 A | | 5/1993 | Fritsch et al. |
| 5,360,547 A | * | 11/1994 | Cockett et al. ................. 210/690 |
| 6,287,532 B1 | * | 9/2001 | Okada et al. ............... 423/420.2 |
| 2003/0049189 A1 | * | 3/2003 | Stamires ................... B01J 20/04 423/155 |
| 2004/0141907 A1 | * | 7/2004 | Eisgruber et al. .......... 423/420.2 |
| 2008/0255400 A1 | * | 10/2008 | Yamazaki ................ B01J 20/08 588/3 |
| 2009/0000991 A1 | * | 1/2009 | Francis ................... C10G 11/04 208/253 |
| 2009/0267024 A1 | * | 10/2009 | Ono .............................. 252/184 |
| 2009/0305885 A1 | * | 12/2009 | Yamada ............... B01J 20/0222 502/414 |

FOREIGN PATENT DOCUMENTS

| | | |
|---|---|---|
| EP | 0 369 275 A1 | 5/1990 |
| JP | 1973-069780 | 9/1973 |
| JP | 2000-233188 | 8/2000 |
| JP | 2001-269664 | 10/2001 |
| JP | 2005-193167 | 7/2005 |
| JP | 2005-255441 | 9/2005 |
| JP | 2005-263596 | 9/2005 |
| JP | 2005-306667 | 11/2005 |
| WO | WO/2005/087664 * | 9/2005 |
| WO | WO 2007077779 A1 * | 7/2007 |

OTHER PUBLICATIONS

International Search Report and Written Opinion for PCT/JP2007/000814, Feb. 10, 2009.*
Hou et al, "Hydration, expansion, structure, and dynamics of layered double hydroxides", 2003, American Mineralogist, vol. 88, pp. 167-179.*
EPO Search Report Dated Mar. 22, 2011 for EP App. No. 07827780.
Singapore Search report for Appl. No. SG 200900685-9.
Singapore Written Opinion for Appl. No. SG 200900685-9 dated Aug. 10, 2010.
Singapore Written Opinion for Appl. No. SG 200900685-9 dated Sep. 28, 2009.

* cited by examiner

*Primary Examiner* — Wayne Langel
(74) *Attorney, Agent, or Firm* — Factor Intellectual Property Law Group, Ltd.

(57) ABSTRACT

A hydrotalcite-like granular material having a grain size of 0.24 mm or larger is produced by drying a material that contains at least a hydrotalcite-like substance and that has a water content of 70% or lower at equal to or lower than a temperature at which the hydrotalcite-like substance is dehydrated of crystal water contained therein, preferably at 90° C. or higher and 110° C. or lower, such that the resulting hydrotalcite-like granular material has a water content of 10% or higher. In this manner, a hydrotalcite-like granular material that has a stable morphology and a high anion exchange performance and that can be produced at a low cost can be produced.

6 Claims, No Drawings

HYDROTALCITE-LIKE PARTICULATE MATERIAL AND METHOD FOR PRODUCTION THEREOF

RELATED APPLICATIONS

This application claims the filing benefit of International Patent Application No. PCT/JP2007/000814, filed Jul. 31, 2007, which claims the filing benefit of Japanese Patent Application No. 2006-207972 filed Jul. 31, 2006, the contents of all of which are incorporated herein by reference.

TECHNICAL FIELD

The present invention relates to a hydrotalcite-like granular material and a method for production thereof.

BACKGROUND ART

Hydrotalcite, which is a species of naturally occurring layered clay mineral, contains, as the main skeleton, hydroxides of elements such as magnesium, aluminum, etc. that naturally exist in abundance, and it is relatively easy to synthesize hydrotalcite. Hence, various synthesis methods have been disclosed. For example, one of the disclosed methods produces hydrotalcite in a water solvent by using magnesium hydroxide as a magnesium source (e.g., see Patent Literature 1), and another of the disclosed methods reacts magnesium ions with aluminum ions in an aqueous solution in the presence of alkali (e.g., see Patent Literature 2).

It is also known that hydrotalcite has an anion exchange effect. If hydrotalcite can work the anion exchange effect to immobilize arsenic, fluorine, boron, selenium, hexavalent chromium, nitrite ion, and other anionic hazardous substances, it can be expected to contribute to the technologies for improving safety of waste products or the technologies for detoxifying and reforming the environment, by improving the quality of contaminated water, preventing elution of hazardous substances, ameliorating soil, promoting stabilization of hazardous substances at waste disposal sites, etc.

One method of immobilizing anionic hazardous substances may mix powder hydrotalcite in a solution, in which hazardous substances dissolve, to immobilize the hazardous substances, and then isolate hydrotalcite from the solution by pressurization using a filter press or the like. However, this method requires a pressurization means for pressing hydrotalcite and the solution to a filter fabric with a large pressure, which leads to a problem that the whole instrument becomes large.

Hence, small facilities use granular hydrotalcite, which is a state of hydrotalcite solidified to form grains to enable anionic hazardous substances to be immobilized with a relatively small pressure. Granular hydrotalcite needs to have a large grain size so as not to cause filter clogging, etc., and conceivable methods for production thereof may use a granulating machine, a binder, etc.

Patent Literature 1: Unexamined Japanese Patent Application KOKAI Publication No. H6-329410
Patent Literature 2: Unexamined Japanese Patent Application KOKAI Publication No. 2003-26418

DISCLOSURE OF INVENTION

Problem to be Solved by the Invention

However, in a case where a granulating machine is used, a separate granulating stage has to be set, which increases the time and costs required for the production. The use of a binder also increases the costs, and the use of this another material than hydrotalcite reduces the ratio of hydrotalcite in the grains, which raises a problem that the grains adsorb less anions.

An object of the present invention is to provide a hydrotalcite-like granular material that has a stable morphology and a high anion exchange performance and that can be produced at a low cost, and a method for production thereof.

Means for Solving the Problem

To achieve the above object, a hydrotalcite-like granular material according to the present invention originates from drying of a material that contains at least a hydrotalcite-like substance and water at equal to or lower than a temperature at which the hydrotalcite-like substance is dehydrated of crystal water contained therein (a temperature at which the hydrotalcite-like substance starts to be dehydrated of crystal water contained therein). A hydrotalcite-like granular material is a state of a hydrotalcite-like substance solidified to form grains.

A hydrotalcite-like granular material according to the present invention also originates from drying of a material that contains at least a hydrotalcite-like substance and that has a water content of 70% or lower at equal to or lower than a temperature at which the hydrotalcite-like substance is dehydrated of crystal water contained therein.

In this case, it is preferred that the drying be performed at 90° C. or higher and 110° C. or lower. Further, it is preferred that the drying be performed under a condition that the humidity is 90% or higher, in terms of water permeability.

Further, a hydrotalcite-like granular material according to the present invention, when prepared in a quantity of 10 g, adsorbs fluorine ions ($F^-$) by an amount of 8 mg/g or more, when the hydrotalcite-like granular material of that quantity is added to and stirred for 60 minutes in a fluorine solution of a quantity of 1000 ml, whose fluorine ion ($F^-$) concentration is 116 mg/l and which is adjusted to 20° C.

It is preferred that these hydrotalcite-like granular materials of the present invention have a water content of 10% or higher. It is preferred that the hydrotalcite-like granular materials contain a chloride. It is preferred that the hydrotalcite-like granular materials be produced from a hydrotalcite-like substance having a crystallite size of 20 nm or smaller. It is preferred that the hydrotalcite-like granular materials adsorb and immobilize a cation. It is preferred that the hydrotalcite-like granular materials have a grain size of 0.24 mm or larger.

A method for production of a hydrotalcite-like granular material according to the present invention includes drying a material that contains at least a hydrotalcite-like substance and water at equal or lower than a temperature at which the hydrotalcite-like substance is dehydrated of crystal water contained therein.

A method for production of a hydrotalcite-like granular material according to the present invention includes drying a material that contains at least a hydrotalcite-like substance and that has a water content of 70% or lower at equal to or lower than a temperature at which the hydrotalcite-like substance is dehydrated of crystal water contained therein.

In this case, it is preferred that the drying be performed such that the hydrotalcite-like granular material maintains a water content of 10% or higher. It is preferred that the hydrotalcite-like substance that is used have a crystallite size of 20 nm or smaller. It is preferred that the drying be performed at 90° C. or higher and 110° C. or lower.

Effect of the Invention

According to the present invention, it is possible to provide a hydrotalcite-like granular material that has a stable morphology and a high anion exchange performance, and that can be produced at a low cost, and a method for production thereof.

BEST MODE FOR CARRYING OUT THE INVENTION

A hydrotalcite-like granular material and a method for production thereof according to the present invention will now be explained.

The hydrotalcite-like granular material according to the present invention is obtained by drying of a material that contains at least a hydrotalcite-like substance and water at equal to or lower than a temperature at which the hydrotalcite-like substance is dehydrated of crystal water contained therein (temperature at which the hydrotalcite-like substance starts to be dehydrated of crystal water contained therein).

A hydrotalcite-like substance is a nonstoichiometric compound having a structural formula of $M^{2+}_{1-x}M^{3+}_{x}(OH)_2(A^{n-})_{x/n} \cdot mH_2O$. $M^{2+}$ represents a divalent metal, and examples of $M^{2+}$ are $Mg^{2+}$, $Fe^{2+}$, $Zn^{2+}$, $Ca^{2+}$, $Li^{2+}$, $Ni^{2+}$, $Co^{2+}$, $Cu^{2+}$, etc. $M_{3+}$ represents a trivalent metal, and examples of $M^{3+}$ are $Al^{3+}$, $Fe^{3+}$, $Mn^{3+}$, etc. $A^{n-}$ represents an anion. A hydrotalcite-like substance of any kind may serve, and, for example, one that is produced by the following method may be used.

First, an acidic solution that contains aluminum ions and magnesium ions is prepared.

Any aluminum source for providing aluminum ions may be used as long as it generates aluminum ions in water, so the source is not limited to a particular substance. For example, alumina, sodium aluminate, aluminum hydroxide, aluminum chloride, aluminum nitrate, bauxite, residue of alumina production from bauxite, aluminum sludge, etc. can be used. These aluminum sources may be solely used or two or more of these sources may be used in combination.

Any magnesium source for providing magnesium ions may be used as long as it generates magnesium ions in water, so the source is not limited to a particular substance. For example, brucite, magnesium hydroxide, magnesite, calcined magnesite, etc. can be used. These magnesium sources may be solely used or two or more of these sources may be used in combination.

It is not necessary that an aluminum compound as the aluminum source and a magnesium compound as the magnesium source fully dissolve in the acidic solution, but at least their aluminum ions and magnesium ions need to exist in the acidic solution. Accordingly, hydrotalcite can be produced without a problem even if the acidic solution contains undissolved masses of the aluminum compound and the magnesium compound.

A general formula of a hydrotalcite that contains aluminum ions and magnesium ions is $Mg^{2+}_{1-x}Al^{3+}_{x}(OH)_2(A^{n-})_{x/n} \cdot mH_2O$, where $A_{n-}$ is an anion. It is known that the commonest composition of a highly crystalline hydrotalcite contains aluminum ions and magnesium ions at a molar ratio of 1:3 (x=0.25). Hence, it is preferred that the molar ratio of the aluminum ions and the magnesium ions in the acidic solution be in the range of 1:5 to 1:2. Within this range, a hydrotalcite-like substance can be produced advantageously in terms of mass balance, without wasting any mass of the aluminum source and the magnesium source.

It is preferred that acidic adjustment of the acidic solution use nitric acid or hydrochloric acid.

Next, the acidic solution containing aluminum ions and magnesium ions is mixed with an alkaline solution that contains alkali. It is preferred that the alkaline solution have a pH value of 8 to 11. The mixing of the acidic solution and the alkaline solution can be by adding the acidic solution fully to the alkaline solution at a breath, or by dripping the acidic solution down into the alkaline solution. However, a preferred manner is to mix the acidic solution and the alkaline solution by suitable amounts at a time, according to the agitation capacity available for mixing. Needles to say, any other method may be used as long as it can sufficiently agitate the acidic solution and the alkaline solution.

Any alkali to be contained in the alkaline solution may be used as long as it can alkalify an aqueous solution, so the alkali is not limited to a particular substance. For example, sodium hydroxide, calcium hydroxide, etc. can be used. Further, sodium carbonate, potassium carbonate, ammonium carbonate, ammonia water, sodium borate, potassium borate, etc. can be used. These alkalis may be solely used or two or more of these alkalis may be used in combination.

Since a highly crystalline hydrotalcite exchanges its ions preferentially for carbonate ions, it cannot efficiently have its ions exchanged for the target anions if it contains carbonate ions. Hence, it is preferred that the acidic solution and the alkaline solution should not contain carbonate ions in order that the hydrotalcite-like substance can efficiently have its ions exchanged for the target anions.

It is preferred that the mixing of the acidic solution and the alkaline solution should not be followed by a ripening process because without ripening, the crystallized hydrotalcite-like substance will not be grown and the hydrotalcite-like substance can have a small crystallite diameter (crystallite size) when its production ends. In this case, since the hydrotalcite-like substance will be maintained in a small crystallite size, the solutions will be colloidal by mixing.

In order not to allow ripening, after the mixing of the acidic solution and the alkaline solution is completed, the mixture solution may be reduced to a pH value at which crystalline growth of the hydrotalcite-like substance stops. For example, a hydrotalcite-like substance having a general formula $Mg^{2+}_{1-x}Al^{3+}_{x}(OH)_2(A^{n-})_{x/n} \cdot mH_2O$ can be stopped from ripening, if its pH value is reduced to equal to or smaller than 9. A hydrotalcite-like substance having a general formula $Zn^{2+}_{1-x}Al^{3+}_{x}(OH)_2(A^{n-})_{x/n} \cdot mH_2O$ can be stopped from ripening, if its pH value is reduced to equal to or smaller than 5.

Ripening can also be stopped by moisture removal. For moisture removal, suction filtration, centrifugal separation, and such suitable methods may be employed.

Hence, for example, in order that a hydrotalcite-like substance having a general formula $Mg^{2+}_{1-x}Al^{3+}_{x}(OH)_2(A^{n-})_{x/n} \cdot mH_2O$ may have a crystallite size of 20 nm or smaller, the mixture solution may be adjusted to a pH value of 9 or smaller, within 120 minutes after or preferably at the same time when the mixing of the acidic solution and the alkaline solution is completed. Any method may be taken to obtain a pH value of 9 or smaller. For example, the acidic solution and the alkaline solution may be diluted with water immediately after they are mixed. It is also fine to remove moisture from the acidic solution and the alkaline solution by suction filtration, centrifugal separation, or the like within 120 minutes after or preferably at the same time when the solutions are mixed. In order that it is guaranteed that ripening will not occur, the hydrotalcite-like substance may be washed soon after the mixing of the acidic solution and the alkaline solution is completed. Note that chlorides such as NaCl, etc. that are produced during the synthesis may be kept in the substance.

After having as much moisture as possible removed therefrom with a predetermined pressure applied by a dehydrator such as a filter press, etc., the hydrotalcite-like substance produced in this manner is dried at equal to or lower than a temperature at which the hydrotalcite-like substance is dehydrated of crystal water contained therein. In other words, not the crystallized hydrotalcite-like substance but only the water is dried out. Specifically, the hydrotalcite-like substance that has a water content of 70% or lower, preferably 65% or lower, or more preferably 60% or lower is dried until there is finally produced a hydrotalcite-like granular material that has a water content of 10% or higher and 20% or lower, preferably 10% or higher and 15% or lower, or more preferably 11% or higher and 12% or lower. The water content of the hydrotalcite-like granular material is maintained at 10% or higher because with a water content of lower than 10%, the hydrotalcite-like granular material will absorb water when it is exposed to a solution or the like and drastically swell in volume until it can no longer be granular. Note that the water content is the quantity of water with respect to the total quantity of the hydrotalcite-like substance that contains water. The quantity of water contained in the hydrotalcite-like substance was measured based on Japan Industrial Standard "Test method for water content of soils" (JIS A 1203:1999).

The drying temperature may be any temperature as long as it is equal to or lower than a temperature at which the hydrotalcite-like substance is dehydrated of crystal water contained therein. In order to give the hydrotalcite-like granular material a large grain size, it is preferable to use a relatively low drying temperature. However, if the drying temperature is too low, the hydrotalcite-like granular material will get easily dissolved in water. Hence, a specific drying temperature is preferred to be 25° C. or higher and 125° C. or lower, preferably 90° C. or higher and 110° C. or lower, or more preferably 95° C. or higher and 105° C. or lower.

The drying may be performed in any manner. For example, an ordinary drying furnace or the like may be used. Natural drying at a room temperature may also be used. A higher humidity is preferred during the drying for the morphological stability of the hydrotalcite-like granular material. For example, the amount of water vapor in the drying furnace may be adjusted to near the amount of saturated water vapor (90% to 100% humidity).

The hydrotalcite-like substance dried in any such manner may be sifted, so that resulting separated chlorides, etc. may be removed.

The hydrotalcite-like granular material may be adjusted in grain size according to its applications. In this case, in anticipation of its use in a column or the like, the hydrotalcite-like granular material may preferably have a grain size of 0.24 mm or larger, more preferably 0.36 mm or larger, or still more preferably 1 mm or larger and 2 mm or smaller. The grain size may be adjusted in any manner, and may be adjusted by crushing the material with a hammer or the like and sifting the fragments through a sieve that has a desired sifting fineness.

It is preferable that the hydrotalcite-like granular material produced in this manner have a higher amount of anion adsorption. For example, it is fine if its fluorine ion adsorption is at least 8 mg/g or more, preferably 8.5 mg/g or more, or more preferably 8.7 mg/g or more. Further, it is more preferred that the hydrotalcite-like granular material according to the present invention adsorb and immobilize cations such as cadmium ions, lead ions, etc. The hydrotalcite-like substance used as the base material will provide a higher anion exchange effect and hence a higher adsorption of fluorine ions, etc. as its crystallite size is smaller. Hence, a hydrotalcite-like substance having a crystallite size of 20 nm or smaller or preferably 10 nm or smaller may be used as the base material.

EXAMPLES

Examples of the hydrotalcite-like granular material and a method for production thereof according to the present invention will now be explained below. However, the present invention is not limited to these examples. Since the hydrotalcite-like granular materials according to the examples are produced in almost the same manner as the method described above, redundant explanation for any such same portion will not be provided.

The amount of adsorbed fluorine ions is measured in the following manner. First, a 1000 ml quantity of fluorine solution adjusted to have a fluorine concentration of 116 mg/l is prepared. Next, a 10 g quantity of hydrotalcite-like granular material produced according to each example is added to the solution, and the mixture is stirred for one hour by a magnetic stirrer and filtered through a filter. The hydrotalcite-like granular material used here has an adjusted grain size of 2 to 4.75 mm Anion adsorption is let to occur while the fluorine solution is adjusted to a temperature of 20° C. in a room having a constant temperature of 20° C. Change of the concentration of the fluorine solution is measured with the use of an absorptiometer (a product No. LASA-50 made by DR. LANGE) and a reagent (LCK323) specially prepared for this absorptiometer, and the amount of anions adsorbed per 1 g of the hydrotalcite-like granular material is calculated as the amount of adsorbed fluorine ions.

Measurement of adsorption and immobilization of cadmium ions and lead ions is conducted in the following manner. First, cadmium solutions that contain cadmium (Cd) at 2250 ppm (high concentration) and 1.6 ppm (low concentration) respectively and lead solutions that contain lead (Pb) at 885 ppm (high concentration) and 1.17 ppm (low concentration) respectively are prepared in a quantity of 100 ml each. Next, powder hydrotalcite-like substance is added such that its amount is adjusted to 0.1 wt %, 0.5 wt %, 1 wt %, and 5 wt % in the respective solutions. The results of addition are stirred for one hour by a magnetic stirrer and filtered through a filter. Adsorption and immobilization of cadmium ions and lead ions are let to occur while cadmium solutions and lead solutions are adjusted to a temperature of 20° C. in a room having a constant temperature of 20° C. Change of the concentration of the cadmium solutions and lead solutions is measured with the use of an absorptiometer (a product No. LASA-50 made by DR. LANGE) and reagents LCK308 and LCK306 specially prepared for this absorptiometer for cadmium and lead ions respectively (see Table 2). Filtration residue (hydrotalcite-like substance) is measured by XRD and SEM/EDS.

Further, water permeability is measured in order to observe the morphological stability of the hydrotalcite-like granular material. Water permeability indicates how easy it is for water to flow through a cylinder that is filled with the hydrotalcite-like granular material when the water is let to flow under a constant pressure. A hydrotalcite-like granular material that is morphologically stable shows a constant water permeability, whereas a hydrotalcite-like granular material that is morphologically unstable and hence easy to fragment makes it gradually less easy for water to flow over time with a decreasing water permeability. According to the present embodiment, the following measurement is conducted for water permeability evaluation. First, a cylinder having a height of 250 mm and a flow path inner diameter of 90 mm is bottomed with a PMMA grating that has openings of a 5 mm diameter at a 7 mm pitch, which is further underlain by a PP mesh 40 having openings of a 0.36 mm diameter. A 1 Kg quantity of hydrotalcite-like granular material is filled into the cylinder. The hydrotalcite-like granular material used here has an adjusted grain size of 2 to 4.75 mm Next, water having a water head difference of 4 m is poured into the cylinder bottom up for twelve hours and the quantity of water flow is measured to obtain the water permeability. The water permeability measurements obtained here are shown in Table 1 in a manner of indicating higher ones as high, middle ones as middle, and lower ones as low.

Sample Material 1

A material having a water content of about 63% that contains a hydrotalcite-like substance having a crystallite size of 20 nm or smaller and an average crystallite size of 10 nm is naturally dried at a room temperature for one week. A hydrotalcite-like granular material produced in this manner is a sample material 1, whose adsorption and water permeability change are shown in Table 1.

Sample Material 2

A material having a water content of about 63% that contains a hydrotalcite-like substance having a crystallite size of 20 nm or smaller and an average crystallite size of 10 nm is dried in a drying furnace having a temperature of 50° C. for 24 hours. A hydrotalcite-like granular material produced in this manner is a sample material 2, whose adsorption and water permeability change are shown in Table 1.

Sample Material 3

A material having a water content of about 63% that contains a hydrotalcite-like substance having a crystallite size of 20 nm or smaller and an average crystallite size of 10 nm is dried in a drying furnace having a temperature of 100° C. for 24 hours. A hydrotalcite-like granular material produced in this manner is a sample material 3, whose adsorption and water permeability change are shown in Table 1.

Sample Material 4

A material having a water content of about 63% that contains a hydrotalcite-like substance having a crystallite size of 20 nm or smaller and an average crystallite size of 10 nm is dried in a drying furnace having a temperature of 100° C. for 24 hours. The drying is conducted while the ventilator exit of the drying furnace is closed to place the interior of the drying furnace under a humidity condition of near 100%. A hydrotalcite-like granular material produced in this manner is a sample material 4, whose adsorption and water permeability change are shown in Table 1.

Sample Material 5

A material having a water content of about 63% that contains a hydrotalcite-like substance having a crystallite size of 20 nm or smaller and an average crystallite size of 10 nm is dried in a drying furnace having a temperature of 125° C. for 24 hours. A hydrotalcite-like granular material produced in this manner is a sample material 5, whose adsorption and water permeability change are shown in Table 1.

Sample Material 6 (Comparative Example)

A powder hydrotalcite-like substance having a crystallite size of 20 nm or smaller and an average crystallite size of 10 nm is mixed with a binder and molded into a spherical shape. This is a sample material 6, whose adsorption is shown in Table 1.

TABLE 1

| | | Sample Material 1 | Sample Material 2 | Sample Material 3 | Sample Material 4 | Sample Material 5 | Sample Material 6 |
|---|---|---|---|---|---|---|---|
| Drying temperature (° C.) | | natural drying (25° C.) | 50° C. | 100° C. | 100° C. | 125° C. | — |
| | Ventilation | — | ventilated | ventilated | not ventilated | ventilated | — |
| $F^-$ adsorption rate (%) | Initial concentration (mg/l) | 116 | 116 | 116 | 116 | 116 | 116 |
| | Solution concentration (mg/l) | 18.6 | 19.3 | 10.9 | 29.0 | 8.9 | 46.0 |
| | Adsorption amount (mg/g) | 9.7 | 9.7 | 10.5 | 8.7 | 10.7 | 7.0 |
| Water permeability | | low | low | middle | high | middle | — |

TABLE 2

| Amount of hydrotalcite-like substance added (wt %) | Cadmium concentration (ppm) | | Lead concentration (ppm) | |
|---|---|---|---|---|
| | High concentration | Low concentration | High concentration | Low concentration |
| 0 (initial concentration) | 2250 | 1.6 | 885 | 1.17 |
| 0.1 | — | 0.5 | — | 0.02 |
| 0.5 | 1880 | 0.02 | 288 | 0.04 |
| 1 | 1620 | 0.02 | 67.5 | 0.06 |
| 2 | 475 | — | 47.5 | — |

From Table 1, the hydrotalcite-like granular materials (sample materials 1 to 5) according to the present invention have a higher fluorine ion adsorption than that of the sample material 6 formed into a spherical shape with a binder.

Further, from Table 1, the hydrotalcite-like granular material of the sample material 4, which is dried under a relatively high humidity without ventilation shows the smallest change in the water permeability and is hence morphologically stable.

From Table 2, it can be understood that the powder hydrotalcite-like substance that constitutes the hydrotalcite-like granular material according to the present invention reduces the concentrations of cadmium ions and lead ions, which are cations. According to the XRD measurement, no other diffraction peak than that of the hydrotalcite-like substance is detected from the hydrotalcite-like substance after the test for adsorption and immobilization of cadmium ions. On the other hand, a diffraction peak of lead chloride hydroxide (PbClOH) in addition to that of the hydrotalcite-like substance is detected from the hydrotalcite-like substance after the test for adsorption and immobilization of lead ions. Further, lead chloride production is identified in the hydrotalcite-like substance after the test for adsorption and immobilization of lead ions, while no cadmium-ion compound is observed in the hydrotalcite-like substance after the test for adsorption and immobilization of cadmium ions. Accordingly, it can be considered that the cadmium ions are adsorbed by the hydrotalcite-like substance while the lead ions are immobilized as lead chloride hydroxide (PbClOH) with a catalytic effect of the hydrotalcite-like substance. From these results, it can be understood that the hydrotalcite-like granular material according to the present invention adsorbs and immobilizes cations such as cadmium ions, lead ions, etc.

From the above results, it can be understood that the hydrotalcite-like granular material according to the present invention has morphological stability and a high anion exchange performance and can be produced at a low cost.

It is emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

What is claimed is:

1. A method for production of a hydrotalcite-like granular material, comprising:

forming a hydrotalcite-like substance by mixing an acidic solution and an alkaline solution without a ripening, the acidic solution containing a divalent metal and a trivalent metal;

forming a solidified material by dehydrating a material that contains at least the hydrotalcite-like substance which is a nonstoichiometric compound having a structural formula of $Mg^{2+}_{1-x}Al^{3+}_{x}(OH)_2(A^{n-})_{x/n} \cdot mH_2O$, where $A^{n-}$ represents an anion, wherein x represents a ratio of $Al^{3+}$ atoms to $Mg^{2+}$ atoms and is in a range between 1:5 to 1:2, and m represents a number and n represents a natural number, and which has a crystallite size of 20 nm or smaller and water by applying a pressure until a water content becomes 70% or smaller;

drying the solidified material at a temperature between 90° C. and 110° C. and in an ambient humidity of 90% or higher until the water content becomes between 10% and 20%; and adjusting a particle size of the dried solidified material to be 0.24 mm or larger.

2. A method for production of a hydrotalcite-like granular material, comprising:

forming a hydrotalcite-like substance by mixing an acidic solution and an alkaline solution without a ripening, the acidic solution containing a divalent metal and a trivalent metal;

forming a solidified material by dehydrating a material that contains at least the hydrotalcite-like substance which is a nonstoichiometric compound having a structural formula of $Mg^{2+}_{1-x}Al^{3+}_{x}(OH)_2(A^{n-})_{x/n} \cdot mH_2O$, where $A^{n-}$ represents an anion, wherein x represents a ratio of $Al^{3+}$ atoms to $Mg^{2+}$ atoms and is in a range between 1:5 to 1:2, and m represents a number and n represents a natural number, and which has a crystallite size of 20 nm or smaller and water by applying a pressure by a dehydrator until a water content becomes 70% or smaller;

drying the solidified material at a temperature between 90° C. and 110° C. and in an ambient humidity of 90% or higher until the water content becomes between 10% and 20%; and adjusting a particle size of the dried solidified material to be 0.24 mm or larger.

3. The method according to claim 2 wherein the step of applying a pressure by a dehydrator, comprises the dehydrator being a filter press.

4. The method for production of the hydrotalcite-like granular material according to claim 1, wherein the drying is performed until the water content becomes between 10% to 15%.

5. The method for production of the hydrotalcite-like granular material according to claim 1, wherein the drying is performed until the water content becomes between 11% to 12%.

6. The method for production of the hydrotalcite-like granular material according to claim 1, wherein the drying is performed for 24 hours.

* * * * *